United States Patent (10) Patent No.: US 9,835,071 B2
Seo (45) Date of Patent: Dec. 5, 2017

(54) APPARATUS FOR TRANSFERRING RECOVERED POWER OF WASTE HEAT RECOVERY UNIT

(71) Applicant: HYUNDAI MOTOR COMPANY, Seoul (KR)

(72) Inventor: Jung Min Seo, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 113 days.

(21) Appl. No.: 14/956,348

(22) Filed: Dec. 1, 2015

(65) Prior Publication Data

US 2017/0009632 A1 Jan. 12, 2017

(30) Foreign Application Priority Data

Jul. 7, 2015 (KR) ........................ 10-2015-0096555

(51) Int. Cl.
| F16D 31/02 | (2006.01) |
| F01N 5/02 | (2006.01) |
| F15B 1/02 | (2006.01) |
| F02G 5/02 | (2006.01) |
| F15B 21/14 | (2006.01) |
| F01N 5/00 | (2006.01) |

(52) U.S. Cl.
CPC ............... *F01N 5/02* (2013.01); *F01N 5/00* (2013.01); *F02G 5/02* (2013.01); *F15B 1/024* (2013.01); *F15B 21/14* (2013.01); *Y02T 10/166* (2013.01)

(58) Field of Classification Search
CPC . F02G 5/02; F15B 1/024; F15B 21/14; Y02T 10/166
See application file for complete search history.

(56) References Cited

U.S. PATENT DOCUMENTS

| 4,215,545 A * | 8/1980 | Morello ................. B60K 6/12 60/414 |
| 5,655,369 A * | 8/1997 | Folsom ................. F04C 14/20 60/414 |
| 8,387,386 B2 | 3/2013 | Schmeltz |
| 2009/0229265 A1 | 9/2009 | Mayer et al. |
| 2011/0115223 A1 | 5/2011 | Stahlkopf et al. |
| 2012/0286522 A1 | 11/2012 | Stahlkopf et al. |
| 2013/0000291 A1 | 1/2013 | Nelson et al. |
| 2013/0168961 A1 | 7/2013 | Stahlkopf et al. |
| 2013/0291529 A1 | 11/2013 | Stahlkopf et al. |
| 2015/0054291 A1 | 2/2015 | Stahlkopf et al. |

FOREIGN PATENT DOCUMENTS

| JP | H05-202760 A | 8/1993 |
| JP | H08-026082 A | 1/1996 |
| JP | 2008-008224 A | 1/2008 |
| JP | 2008-121674 A | 5/2008 |
| KR | 10-0488642 B1 | 5/2005 |
| KR | 10-2009-0018619 A | 2/2009 |
| KR | 10-0960647 B1 | 6/2010 |
| KR | 10-2014-0015334 A | 2/2014 |

* cited by examiner

*Primary Examiner* — Michael Leslie
(74) *Attorney, Agent, or Firm* — McDermott Will & Emery LLP

(57) ABSTRACT

An apparatus for transferring recovered power of a waste heat recovery unit (WHRU) includes a hydraulic pump converting the recovered power generated by an expander of the WHRU into a hydraulic energy; and a hydraulic motor converting the hydraulic energy converted by the hydraulic pump into rotational energy and transferring the rotational energy to a vehicle engine.

14 Claims, 8 Drawing Sheets

APPARATUS FOR TRANSFERRING RECOVERED POWER OF WASTE HEAT RECOVERY UNIT

CROSS-REFERENCE TO RELATED APPLICATION

This application is based on and claims the benefit of priority to Korean Patent Application No. 10-2015-0096555, filed on Jul. 7, 2015 in the Korean Intellectual Property Office, the disclosure of which is incorporated herein in its entirety by reference.

TECHNICAL FIELD

The present disclosure relates to a waste heat recovery unit (WHRU), and more particularly, to an apparatus for transferring recovered power of a WHRU, capable of transferring power recovered by the WHRU to an output shaft of an engine without a power loss.

BACKGROUND

An internal combustion engine has been widely used in a vehicle, a ship, a small power generator, and the like, and thus, an attempt to improve efficiency of the internal combustion engine has been continuously conducted. In the internal combustion engine, a large quantity of heat is exhausted as waste heat, and a waste heat recovery unit (WHRU) for increasing entire efficiency of the internal combustion engine by recovering the waste heat has been developed.

The WHRU recovers energy from the waste heat exhausted from the engine, converts the recovered energy into electric energy or mechanical energy, and utilizes the electric energy or the mechanical energy in the engine, other electrical accessories, or the like, of the vehicle.

The WHRU uses a Rankine cycle system to effectively recover the waste heat of the engine. The Rankine cycle system for waste heat recovery includes a circulation path through which an operating medium is circulated, and the circulation path of the Rankine cycle system includes an evaporator (boiler) heating and evaporating the operating medium by the waste heat (heat of an exhaust gas and/or heat of an exhaust gas recirculation (EGR) gas) of the engine. An expander expands the operating medium supplied from the evaporator to generate rotation power. A condenser condenses the operating medium exhausted from the expander, and a pump circulates the operating medium on the circulation path.

In the WHRU according to the related art, the expander of the Rankine cycle system is directly connected to an output shaft of the engine through a drive mechanism, such as a gear driver, a belt driver, or the like. Thus, the recovered power of the expander is supplied as an assist power to the engine.

When the expander of the Rankine cycle system is directly connected to the output shaft of the engine through the gear driver, the belt driver, or the like, as described above, the recovered power of the expander is lost during deceleration or braking of the engine.

In addition, when the recovered power of the expander is not sufficiently recovered, such that a revolutions per minute (RPM) of the expander is not appropriately controlled depending on a change in an RPM of the engine, noise and vibrations are generated.

Particularly, when the RPM of the expander is slower than that of the engine, the recovered power of the expander does not assist rotation of the engine, but the engine rotates the expander to decrease fuel efficiency of the engine, which is a major problem in the engine.

SUMMARY

The present disclosure has been made to solve the above-mentioned problems occurring in the prior art while advantages achieved by the prior art are maintained intact.

An aspect of the present inventive concept provides an apparatus for transferring recovered power of a waste heat recovery unit (WHRU), capable of transferring power recovered by the WHRU to an output shaft of an engine without a power loss.

According to an exemplary embodiment of the present inventive concept, an apparatus for transferring recovered power of a waste heat recovery unit (WHRU) includes: a hydraulic pump converting the recovered power generated by an expander of the WHRU into a hydraulic energy; and a hydraulic motor converting the hydraulic energy converted by the hydraulic pump into rotational energy and transferring the rotational energy to a vehicle engine.

The hydraulic motor is connected to the hydraulic pump through a hydraulic line. The hydraulic line may include a hydraulic supply line connecting an outlet port of the hydraulic pump and an inlet port of the hydraulic motor to each other. A hydraulic return line connects an outlet port of the hydraulic motor and an inlet port of the hydraulic pump to each other.

The apparatus may further include an accumulator connected to the hydraulic supply line through a branch line.

The apparatus may further comprise a flow control means installed on the hydraulic supply line. The flow control allows a fluid supplied from the hydraulic pump to flow toward at least any one of the hydraulic motor and the accumulator.

The flow control means allows a fluid supplied from the hydraulic pump to flow toward at least any one of the hydraulic motor and the accumulator may be installed on the hydraulic supply line.

The flow control means may include a directional control valve installed at a portion at which the hydraulic supply line and the branch line are connected to each other.

The directional control valve may have an inlet port connected to the outlet port of the hydraulic pump, a first outlet port connected to the inlet port of the hydraulic motor, and a second outlet port connected to the accumulator.

The directional control valve may have a first position at which both of the first outlet port and the second outlet port are opened, a second position at which the first outlet port is closed and the second outlet port is opened, and a third position at which the first outlet port is opened and the second outlet port is closed. The directional control valve may be switched into the first position, the second position, and the third position by one or more actuators.

At the first position, the inlet port, the first outlet port, and the second outlet port may communicate with one another.

At the second position, the inlet port may communicate with the second outlet port.

At the third position, the inlet port may communicate with the first outlet port.

The flow control means may further include a check valve preventing a counter flow of the fluid from the accumulator to the hydraulic pump.

The check valve may be installed between the directional control valve and the hydraulic pump.

The apparatus may further include an unloading means selectively unloading the hydraulic motor.

The unloading means may be a pressure relief valve installed adjacently to the hydraulic motor.

A bypass path may be installed between an inlet port and an outlet port of the hydraulic motor, and the pressure relief valve may be installed on the bypass path.

A pressure sensor may be installed on the hydraulic supply line.

According to another exemplary embodiment of the present inventive concept, a method for transferring recovered power of a WHRU including a hydraulic pump connected to an expander of the WHRU, a hydraulic motor connected to the hydraulic pump through a hydraulic line, an accumulator installed on the hydraulic line, and a directional control valve installed at a portion at which the hydraulic line and the accumulator are connected to each other includes: a measuring step of measuring vehicle information; and a fluid flow direction controlling step of controlling a flow direction of a fluid circulated through the hydraulic line using the vehicle information measured in the measuring step. In the fluid flow direction controlling step, the fluid is supplied from the hydraulic pump to the hydraulic motor to generate rotational energy in assist power mode, from the hydraulic pump to the accumulator to thereby be stored in the accumulator in a hydraulic energy storing mode, and from the hydraulic pump is simply circulated on the hydraulic line in an idle mode.

The directional control valve may have an inlet port connected to an outlet port of the hydraulic pump, a first outlet port connected to an inlet port of the hydraulic motor, and a second outlet port connected to the accumulator, and in the assist power mode. When it is determined on the basis of the vehicle information measured in the measuring step that assist power is required in an engine, the first outlet port and the second outlet port of the directional control valve may be opened to supply the fluid to the hydraulic motor and the accumulator.

The directional control valve may have an inlet port connected to an outlet port of the hydraulic pump, a first outlet port connected to an inlet port of the hydraulic motor, and a second outlet port connected to the accumulator, and in the hydraulic energy storing mode. When it is determined on the basis of the vehicle information measured in the measuring step that storing of hydraulic energy is required, the first outlet port of the directional control valve may be closed and the second outlet port of the directional control valve may be opened to fill the fluid in the accumulator.

The directional control valve may have an inlet port connected to an outlet port of the hydraulic pump, a first outlet port connected to an inlet port of the hydraulic motor, and a second outlet port connected to the accumulator, and in the idle mode. When it is determined through the vehicle information measured in the measuring step that a stop state of a vehicle is continued for a set time or more and a filled amount of the accumulator is a set value or more, the first outlet port of the directional control valve may be opened and the second outlet port of the directional control valve may be closed, and the hydraulic motor may be controlled in an unloading state.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present inventive concept will be described in detail with reference to the accompanying drawings. For reference, sizes of components, thicknesses of lines, and the like, shown in the accompanying drawings referred to in describing the present disclosure may be exaggerated for convenience of the understanding. In addition, since terms used in a description of the present disclosure are defined in consideration of functions of the present disclosure, they may be changed depending on users, the intension of operators, customs, and the like. Therefore, these terms should be defined based on entire contents of the present disclosure.

Figure 1:
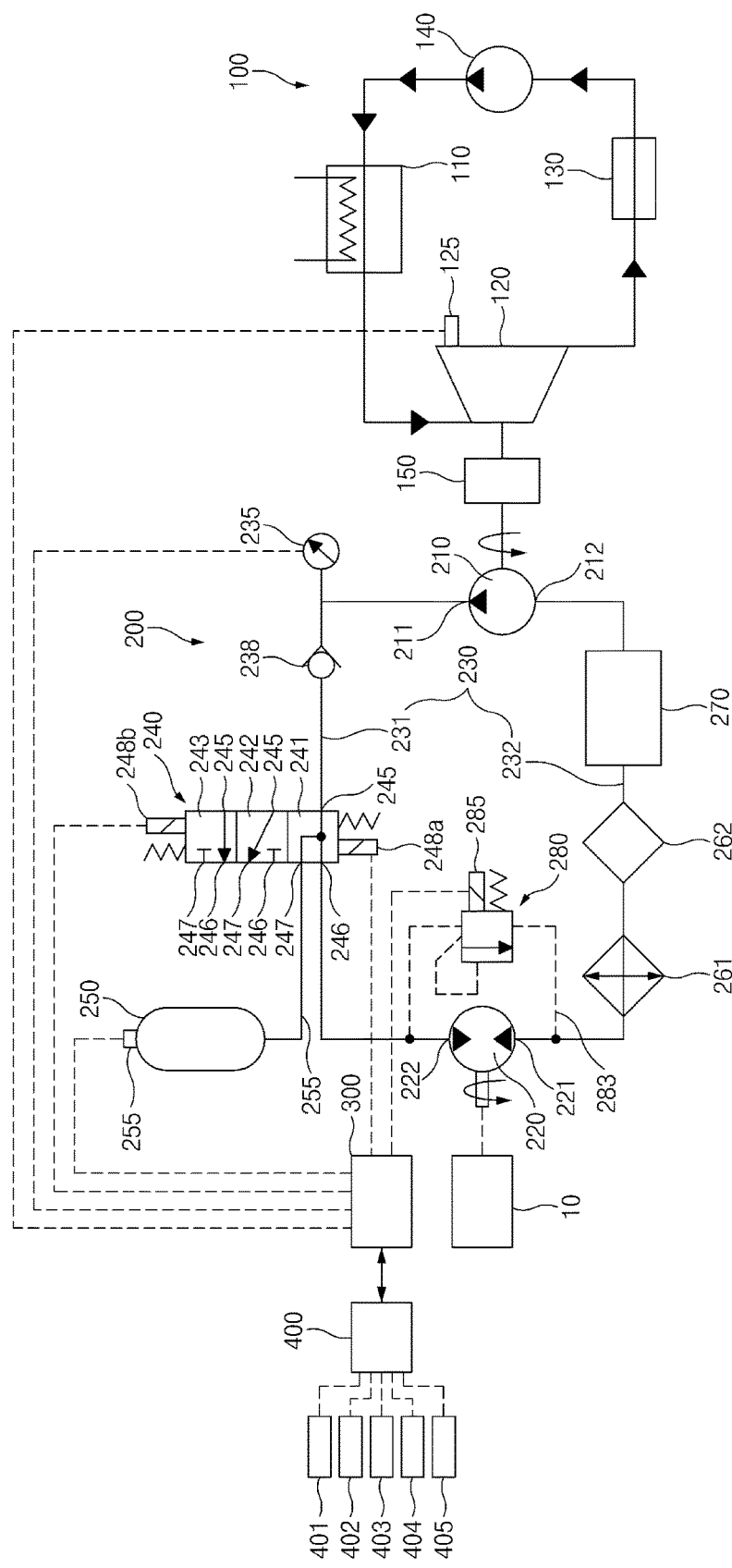
FIG. 1 is a view illustrating a configuration of an apparatus for transferring recovered power of a waste heat recovery system (WHRU) according to an exemplary embodiment of the present inventive concept.

Referring to FIG. 1, a waste heat recovery unit (WHRU) 1 includes a Rankine cycle system 100 which recovers waste heat exhausted from an engine 10 to generate recovered power.

The Rankine cycle system 100 includes an evaporator (boiler) 110, an expander 120, a condenser 130, and a pump 140 installed on a circulation path through which an operating medium circulates. The evaporator 110 heats and evaporates the operating medium by waste heat (heat of an exhaust gas and/or heat of an exhaust gas recirculation (EGR) gas) of the engine to generate an evaporated operating medium, the expander 120 expands the operating medium supplied from the evaporator 110 to generate recovered power, the condenser 130 condenses the operating medium exhausted from the expander 120 to generate a liquid-phase operating medium, and the pump 140 supplies the operating medium from the condenser 130 to the evaporator 110.

An apparatus 200 for transferring recovered power of a WHRU 1 according to an exemplary embodiment of the present inventive concept includes a hydraulic system that may apply sufficient assist power to the engine 10 by accumulating or controlling the recovered power while minimizing transfer loss of the recovered power when it transfers the recovered power of the expander 120 of the Rankine cycle system 100 to the engine 10, other accessories, and the like.

As illustrated in FIG. 1, the apparatus 200 includes a hydraulic pump 210 connected to the expander 120 of the Rankine cycle system 100 and a hydraulic motor 220 connected to the hydraulic pump 210 through a hydraulic line 230.

The hydraulic pump 210 is connected to the expander 120 through a gear box 150, a belt driver, or the like. Therefore, when the recovered power of the expander 120 is transferred to the hydraulic pump 210, the hydraulic pump 210 is driven so as to convert rotation power, which is the recovered power of the expander 120, into hydraulic energy.

The hydraulic motor 220 is connected to the hydraulic pump 210 through the hydraulic line 230. Therefore, when the hydraulic energy of the hydraulic pump 210 is transferred to the hydraulic motor 220 through a fluid supplied through the hydraulic line 230, the hydraulic motor 220 converts the hydraulic energy of the hydraulic pump 210 into rotational energy, and the rotational energy of the hydraulic motor 220 converted as described above may be transferred to the engine 10. An output shaft of the hydraulic motor 220 may be directly connected to a crank shaft of the engine 10 through a belt driver, or the like. Alternatively, the output shaft of the hydraulic motor 220 may be connected to a power takeoff (PTO) of the engine 10, a PTO of a transmission, or the like, to thereby be indirectly connected to the crank shaft of the engine 10.

As described above, since the apparatus 200 may transfer the recovered power of the WHRU to the engine 10 by the hydraulic pump 210 and the hydraulic motor 220 while minimizing a power loss, it may more effectively assist in driving power or power other than driving by the recovered power of the WHRU.

The hydraulic line 230 includes a hydraulic supply line 231 connecting an outlet port 211 of the hydraulic pump 210 and an inlet port 222 of the hydraulic motor 220 to each other, and a hydraulic return line 232 connecting an outlet port 221 of the hydraulic motor 220 and an inlet port 212 of the hydraulic pump 210 to each other. Therefore, a fluid discharged from the hydraulic pump 210 may be supplied to the hydraulic motor 220 through the hydraulic supply line 231, and a fluid discharged from the hydraulic motor 220 may be returned to the hydraulic pump 210 through the hydraulic return line 232.

An accumulator 250 is installed on the hydraulic supply line 231 through a branch line 255. The accumulator 250 may be filled with the fluid transported through the hydraulic supply line 231 to attenuate a pulsation of a hydraulic system generated depending on a fine change in a revolution per minute (RPM) of the engine 10 or a change value of hydraulic energy of the hydraulic pump 210 and maintain stability of the hydraulic system. In addition, the accumulator 250 may be filled with the fluid supplied from the hydraulic pump 210 to store hydraulic energy therein when a hydraulic pressure of the hydraulic supply line 231 is decreased, for example, when the hydraulic motor 220 does not transfer sufficient rotational energy to the engine 10.

Flow control means 240 and 238 controlling a flow direction of the fluid supplied from the hydraulic pump 210 are installed on the hydraulic supply line 231.

The flow control means 240 and 238 may perform a control so that the fluid flows in a direction toward at least one of the hydraulic motor 220 and the accumulator 250 or flows between the hydraulic motor 220 and the accumulator 250. Any one of an assist power mode in which assist power is applied to the engine 10, a hydraulic energy storing mode in which hydraulic energy is stored, and an idle mode in which the fluid is simply circulated may be selectively implemented by the flow control means 240 and 238.

According to the exemplary embodiment, the flow control means 240 may be a directional control valve 240 installed at a portion at which the branch line 255 and the hydraulic supply line 231 are connected to each other.

The directional control valve 240 has an inlet port 245 connected to the outlet port 211 of the hydraulic pump 210, a first outlet port 246 connected to the inlet port 222 of the hydraulic motor 220, and a second outlet port 247 connected to the accumulator 250.

In addition, the directional control valve 240 has a channel structure allowing the fluid supplied from the hydraulic pump 210 to flow in the direction toward at least one of the hydraulic motor 220 and the accumulator 250 or circulating the fluid between the hydraulic motor 220 and the accumulator 250.

The directional control valve 240 has a first position 241 (see FIG. 2) at which both of the first outlet port 246 and the second outlet port 247 are opened, a second position 242 (see FIG. 3) at which the first outlet port 246 is closed and the second outlet port 247 is opened, and a third position 243 (see FIG. 4) at which the first outlet port 246 is opened and the second outlet port 247 is closed.

Figure 2:
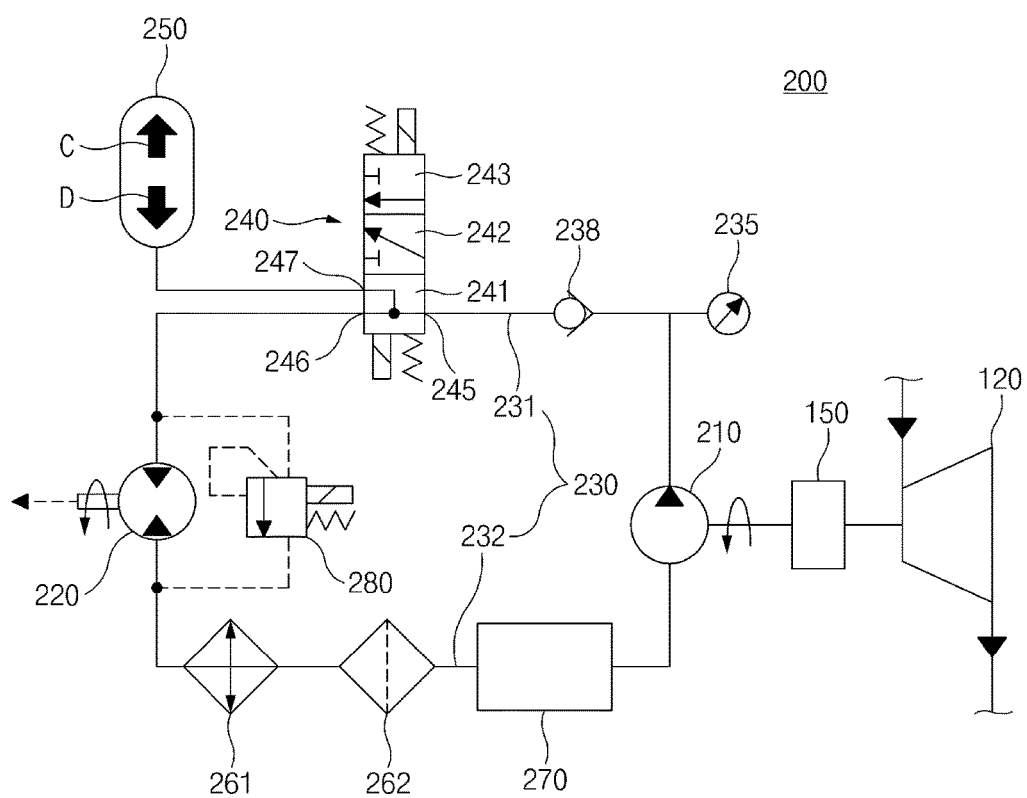
FIG. 2 is a view illustrating an operation state in an assist power mode in the apparatus according to an exemplary embodiment of the present inventive concept.

At the first position 241, as illustrated in FIG. 2, both of the first outlet port 246 and the second outlet port 247 are opened, such that the inlet port 245, the first outlet port 246, and the second outlet port 247 are in communication with one another. Therefore, the fluid supplied from the hydraulic pump 210 may be transported to the accumulator 250 and the hydraulic motor 220. In addition, some of the fluid may be supplied to the accumulator 250 (see an arrow C) to thereby be filled in the accumulator 250, and the fluid filled in the accumulator 250 may also be transported to the hydraulic motor 220 (see an arrow D) (assist power mode).

Figure 3:
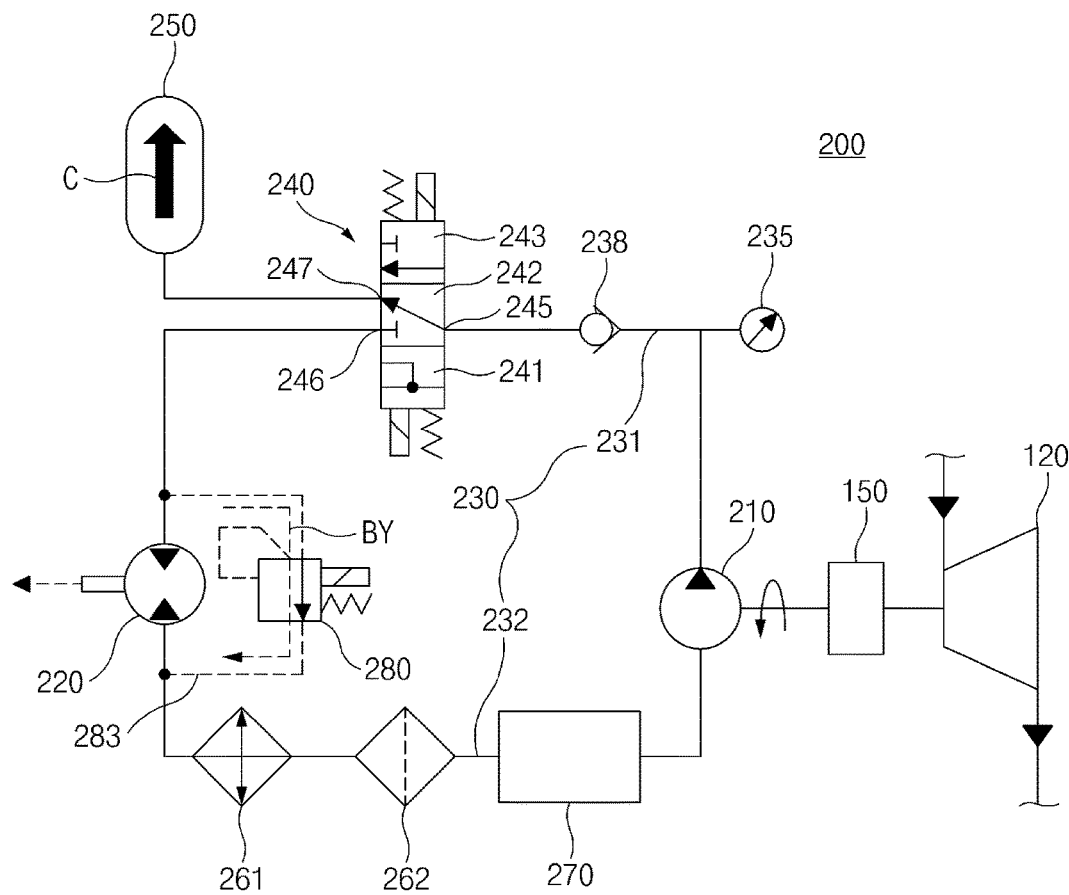
FIG. 3 is a view illustrating an operation state in a hydraulic energy storing mode in the apparatus according to an exemplary embodiment of the present inventive concept.

At the second position 242, as illustrated in FIG. 3, first outlet port 246 is closed and the second outlet port 247 is opened, such that the inlet port 245 is in communication with the second outlet port 247. Therefore, the fluid supplied from the hydraulic pump 210 is supplied toward the accumulator 250 (see an arrow C), such that the accumulator 250 may store hydraulic energy therein (hydraulic energy storing mode).

Figure 4:
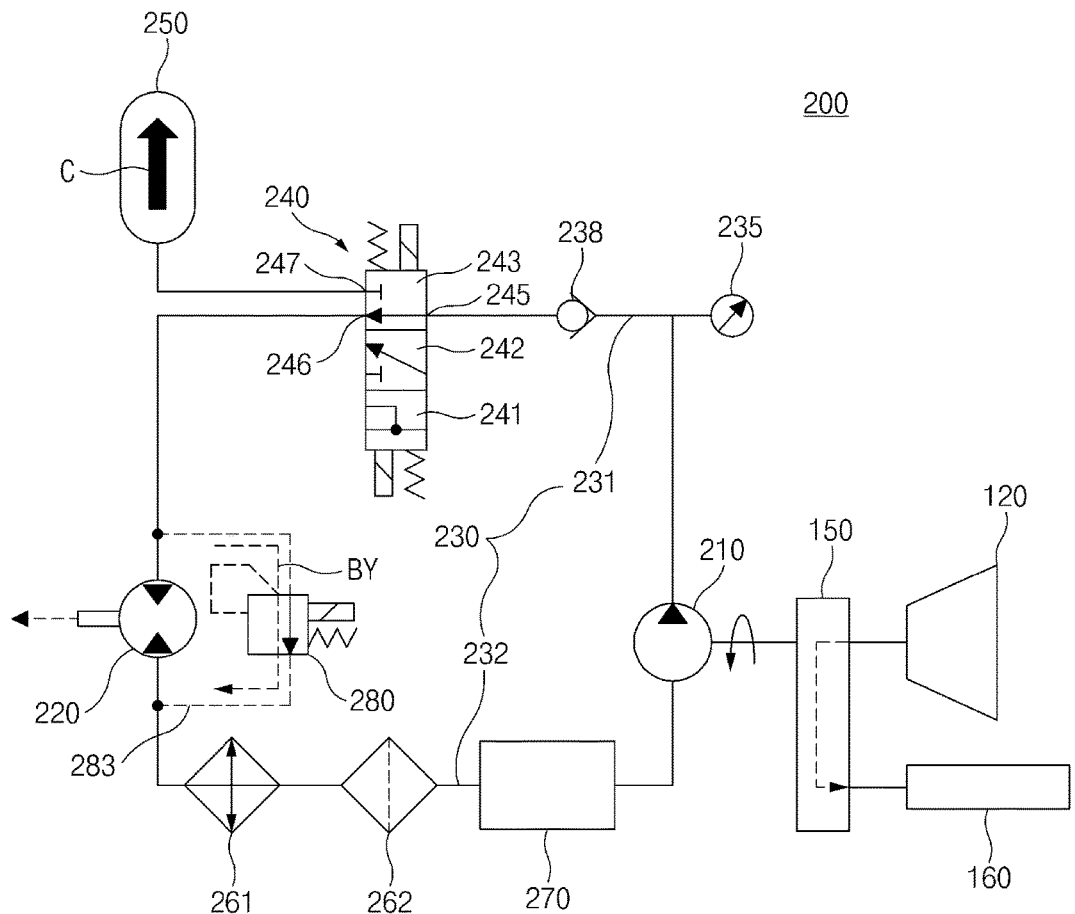
FIG. 4 is a view illustrating an operation state in an idle mode in the apparatus according to an exemplary embodiment of the present inventive concept.

At the third position 243, as illustrated in FIG. 4, first outlet port 246 is opened and the second outlet port 247 is closed, such that the inlet port 245 is in communication with the first outlet port 246. Therefore, the fluid supplied from the hydraulic pump 210 may be transported toward the hydraulic motor 220 and be then returned to the hydraulic pump 210 (idle mode).

In addition, the directional control valve 240 may have one or more actuators 248a and 248b including a combination of a solenoid, a spring, and the like, and perform a change into the first position 241, the second position 242, and the third position 243 by the actuators 248a and 248b.

The flow control means 238 may be a check valve 238 installed between the directional control valve 240 and the outlet pump 211 of the hydraulic pump 210. The check valve 238 prevents a counter flow of the fluid from the accumulator 250 to the hydraulic pump 210. The counter flow of the fluid from the accumulator 250 to the hydraulic pump 210 is prevented by the check valve 238, thereby making it possible to prevent the possibility of damage to the fluid pump 210 and very smoothly perform the transport of the fluid.

As described above, in the apparatus 200 according to the present disclosure, the flow direction of the fluid supplied from the hydraulic pump 210 is variously controlled through the flow control means 240 and 238, thereby making it possible to variously vary and utilize the recovered power of the expander 120.

When the recovered power of the expander 120 is not sufficient to assist in power of the engine 10, after the hydraulic energy is stored using the accumulator 250, the assist power may be applied to the engine 10. Therefore, an RPM of the expander 120 may be maintained in response to a change in an RPM of the engine 10.

A pressure sensor 235 is installed at one side of the hydraulic supply line 231. Particularly, the pressure sensor 235 is installed between the check valve 238 and the outlet port 211 of the hydraulic pump 210. A pressure of the fluid between the hydraulic pump 210 and the hydraulic motor 220 may be precisely measured by the pressure sensor 235.

In addition, a cooler 261 cooling the fluid, a filter 262 filtering foreign materials in the fluid, a reservoir 270 reserving the fluid therein, and the like, may be installed on the hydraulic return line 232.

The apparatus 200 according to the present disclosure includes an unloading means selectively unloading the hydraulic motor 220 in the assist power mode, the idle mode, and the hydraulic energy storing mode described above.

The unloading means may be a pressure relief valve 280 installed adjacent to the hydraulic motor 220.

The pressure relief valve 280 moves between an unloading position and a loading position by an actuator 285 which includes a combination of a solenoid, a spring, and the like. Here, a channel of the pressure relief valve 280 is opened at the unloading position and is closed at the loading position.

A bypass path 283 is installed between the inlet port 222 and the outlet port 221 of the hydraulic motor 220, and the pressure relief valve 280 is installed on the bypass path 283.

The pressure relief valve 280 moves to the unloading position by the actuator 285 to open the channel thereof, thereby bypassing the fluid supplied from the hydraulic pump 210 to the bypass path 283. Therefore, the hydraulic motor 220 becomes an unloading state.

In addition, the pressure relief valve 280 may serve as a safety valve opening a channel thereof to bypass the fluid with respect to the hydraulic motor 220, when a pressure of the fluid introduced to the input port 222 of the hydraulic motor 220 is larger than a preset value.

A controller 300 is connected to an electronic control unit (ECU) 400 of a vehicle to receive various vehicle information from the ECU 400 of the vehicle, thereby controlling an operation of the directional control valve 240 and an operation of the pressure relief valve 280.

The vehicle information measured by various sensors of the vehicle is stored in the ECU 400 of the vehicle. For example, information on whether or not the vehicle is braked detected by a brake sensor 401, information on whether or not the vehicle is accelerated detected by an acceleration pedal sensor 402, information on whether or not a gear shifting manipulation is performed detected by a clutch sensor 403 (in the case of a manual vehicle) or a shifting detecting sensor (in the case of an automatic vehicle), vehicle speed information measured by a vehicle speed sensor 404, information on an RPM of the engine measured by an RPM sensor 405, and the like, are stored in the ECU 400 of the vehicle, and as the vehicle information stored in the ECU 400 of the vehicle is transferred to the controller 300, the controller 300 controls the operation of the directional control valve 240 and the operation of the pressure relief valve 280 on the basis of the vehicle information.

In addition, the controller 300 is connected to a sensor 125 of the expander 120, the pressure sensor 235, and a pressure transducer 255 of the accumulator 250 to receive various information of the expander 120 (a rotation speed, an inlet temperature, an outlet temperature, a flow rate, and the like, of the expander 120), a pressure state of the hydraulic supply line 231, a filled state of the accumulator 250, and the like, thereby controlling the operation of the directional control valve 240 and the operation of the pressure relief valve 280.

The assist power mode, the hydraulic energy storing mode, and the idle mode of the apparatus 200 according to the present disclosure configured as described above will be described in detail with reference to FIGS. 2 to 4.

FIG. 2 illustrates the assist power mode in which the assist power may be supplied to the engine 10.

For example, when the vehicle is in a cruise control state in which it is driven at a set vehicle speed for a set time, thermal equilibrium is accomplished, such that the expander 120 generates sufficient recovered power.

The recovered power of the expander 120 is transferred to the hydraulic pump 210, and the hydraulic pump 210 converts the recovered power into hydraulic energy. In this state, when the directional control valve 240 is switched into the first position 241 by the actuators 248a and 248b, both of the first outlet port 246 and the second outlet port 247 are opened. Thus, the inlet port 245, the first outlet port 246, and the second outlet port 247 communicate with one another. Therefore, the fluid supplied from the hydraulic pump 210 may be transported to the hydraulic motor 220 and the accumulator 250.

Since the output shaft of the hydraulic motor 220 is connected to the engine 10, an RPM of the hydraulic motor 220 and an RPM of the engine 10 are the same. When the pressure of the hydraulic supply line 231 satisfies a set pressure, an RPM of the hydraulic pump 210 and the RPM of the hydraulic motor 220 may maintain a predetermined ratio therebetween. Therefore, when the fluid is supplied from the hydraulic pump 210 to the hydraulic motor 220, the hydraulic motor 220 may convert the hydraulic energy into rotational energy and supply sufficient assist power to the engine 10. Then, the assist power is supplied to the engine 10 as described above, such that fuel efficiency of the engine 10 may be improved.

When the pressure of the hydraulic supply line 231 exceeds the set pressure, some of the fluid may be supplied to the accumulator 250 to thereby be filled in the accumulator 250 (see an arrow C). In addition, when the pressure of the hydraulic supply line 231 becomes lower than the set pressure due to a decrease in the RPM of the engine 10 or the like, the fluid filled in the accumulator 250 may also be transported to the hydraulic motor 220 (see an arrow D) to increase an output of the hydraulic motor 220.

FIG. 3 illustrates a hydraulic energy storing mode in which hydraulic energy generated by the hydraulic pump 210 is stored.

For example, in a braking state of the vehicle, in a neutral state of a gear, in a shifting state of the gear, or in the case in which the recovered power of the expander 120 is low or the RPM of the expander 120 is lower than that of the engine 10, the directional control valve 240 is switched into the second position 242 by the actuators 248a and 248b. Therefore, the first outlet port 246 is closed and the second outlet port 247 is opened, such that the inlet port 245 is in communication with the second outlet port 247. As a result, the fluid supplied from the hydraulic pump 210 is supplied to the accumulator 250 (see an arrow C), such that the accumulator 250 may store the hydraulic energy therein.

Here, the pressure of the fluid passing through the hydraulic motor 220 is maintained as the lowest pressure by an operation of the pressure relief valve 280, such that the hydraulic motor 220 becomes an unloading state. Therefore, since the hydraulic energy is not applied to the hydraulic motor 220, a connection between the engine 10 and the expander 120 is blocked, thereby making it possible to prevent the power of the engine 10 from being lost.

FIG. 4 illustrates an idle mode in which the fluid supplied from the hydraulic pump 210 is simply circulated on the hydraulic supply line 231 and the hydraulic return line 232 when a filled amount of the accumulator 250 is a set value or more, that is, exceeds a filled amount that may be accommodated by the accumulator 250.

For example, when a stop state of the vehicle is maintained for a predetermined time after braking of the vehicle to completely fill the accumulator 250 with the fluid, an overload may be applied to the hydraulic motor 220. Therefore, the directional control valve 240 is switched into the third position 243 by the actuators 248*a* and 248*b*. Accordingly, the first outlet port 246 is opened and the second outlet port 247 is closed. Thus, the inlet port 245 communicates with the first outlet port 246. As a result, a simple circulation flow in which the fluid supplied from the hydraulic pump 210 is transported toward the hydraulic motor 220 and is then returned to the hydraulic pump 210 may be performed. Therefore, a loss of the hydraulic energy may be minimized, and stability of the hydraulic system may be secured.

Here, the pressure of the fluid passing through the hydraulic motor 220 is maintained as the lowest pressure by an operation of the pressure relief valve 280, such that the hydraulic motor 220 becomes an unloading state. Therefore, since the hydraulic energy is not applied to the hydraulic motor 220, a connection between the engine 10 and the expander 120 is blocked, thereby making it possible to prevent the power of the engine 10 from being lost.

Since the entire recovered power of the expander 120 does not need to be transferred to the hydraulic pump 210, extra recovered power may be transferred to other accessories such as a power generator 160 and the like, through the gear box 150, such that utilization of the recovered power may be improved.

Figure 5:
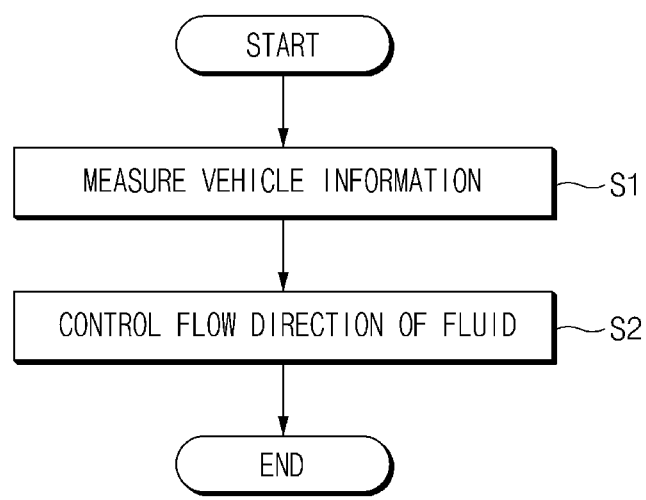
FIG. 5 is a flow chart illustrating a method for transferring recovered of a waste heat recovery system (WHRU) according to an exemplary embodiment of the present inventive concept.

FIG. 5 is a flow chart illustrating a method for transferring recovered power according to an exemplary embodiment of the present inventive concept.

As illustrated in FIG. 5, various vehicle information such as information on whether or not the vehicle is braked, information on whether or not the vehicle is accelerated, information on a gear shifting state, vehicle speed information, various information of the expander 120, information on a pressure state of the hydraulic supply line 231, and the like, is measured (S1), and a flow direction of fluid circulating through the hydraulic line 230 is controlled using the measured vehicle information (S2).

The flow direction of the fluid is controlled by the directional control valve 240, such that any one of an assist power mode, a hydraulic energy storing mode, and an idle mode may be implemented.

Figure 6:
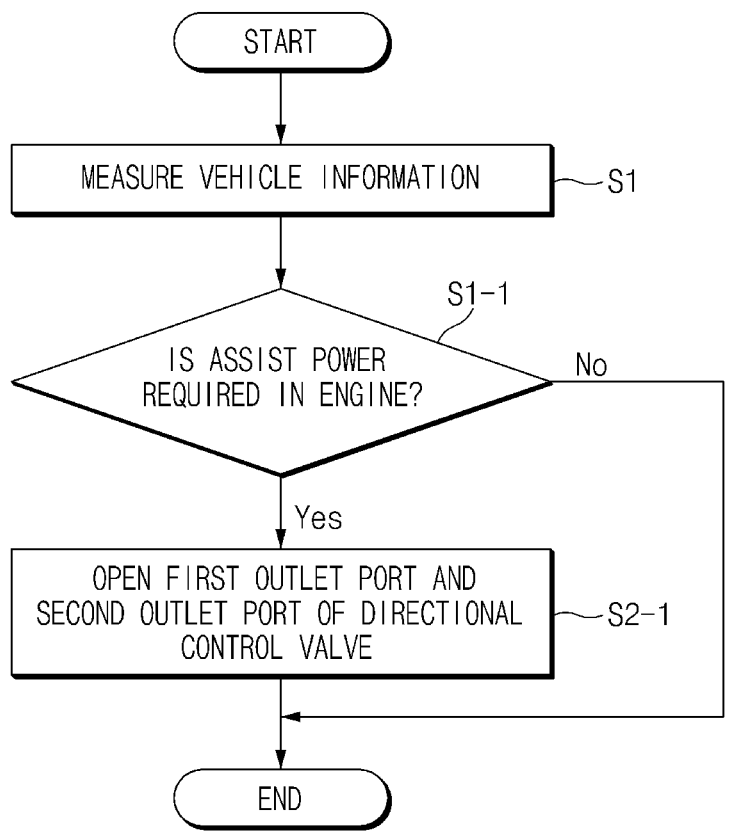
FIG. 6 is a flow chart illustrating operation processes in an assist power mode in the method according to an exemplary embodiment of the present inventive concept.

FIG. 6 is a flow chart illustrating the assist power mode in which the assist power is supplied to the engine 10.

Various vehicle information such as information on whether or not the vehicle is braked, information on whether or not the vehicle is accelerated, information on whether or not a gear shifting manipulation is performed, vehicle speed information, various information of the expander 120, information on a pressure state of the hydraulic supply line 231, and the like, is measured (S1), and the controller 300 decides whether or not the assist power is required in the engine 10 (S1-1). For example, it may be detected by the vehicle speed sensor 404 whether or not a vehicle speed is maintained as a set vehicle speed for a set time, and it may be decided that the assist power is required in the engine 10 when an operation of the acceleration pedal sensor 402 is sensed.

When it is decided that the assist power is required in the engine 10, the controller 300 switches the directional control valve 240 into the first position 241 to open the first outlet port 246 and the second outlet port 247 of the directional control valve 240, as illustrated in FIG. 2.

Therefore, the inlet port 245, the first outlet port 246, and the second outlet port 247 of the directional control valve 240 communicate with each another, and the fluid supplied from the hydraulic pump 210 may be transported to the accumulator 250 and the hydraulic motor 220.

Since the output shaft of the hydraulic motor 220 is connected to the engine 10, an RPM of the hydraulic motor 220 and an RPM of the engine 10 are the same. When a pressure of the hydraulic supply line 231 detected by the pressure sensor 235 satisfies a set pressure, an RPM of the hydraulic pump 210 and the RPM of the hydraulic motor 220 may maintain a predetermined ratio therebetween. Therefore, when the fluid is supplied from the hydraulic pump 210 to the hydraulic motor 220, the hydraulic motor 220 may convert the hydraulic energy into the rotational energy and then supply sufficient assist power to the engine 10. Then, the assist power is supplied to the engine 10 as described above, such that fuel efficiency of the engine 10 may be improved.

In addition, when the pressure of the hydraulic supply line 231 exceeds the set pressure, some of the fluid may be supplied to the accumulator 250 to thereby be filled in the accumulator 250 (see an arrow C). In addition, when the pressure of the hydraulic supply line 231 becomes lower than the set pressure due to a decrease in the RPM of the engine 10 or the like, the fluid filled in the accumulator 250 may also be transported to the hydraulic motor 220 (see an arrow D) to increase an output of the hydraulic motor 220.

Figure 7:
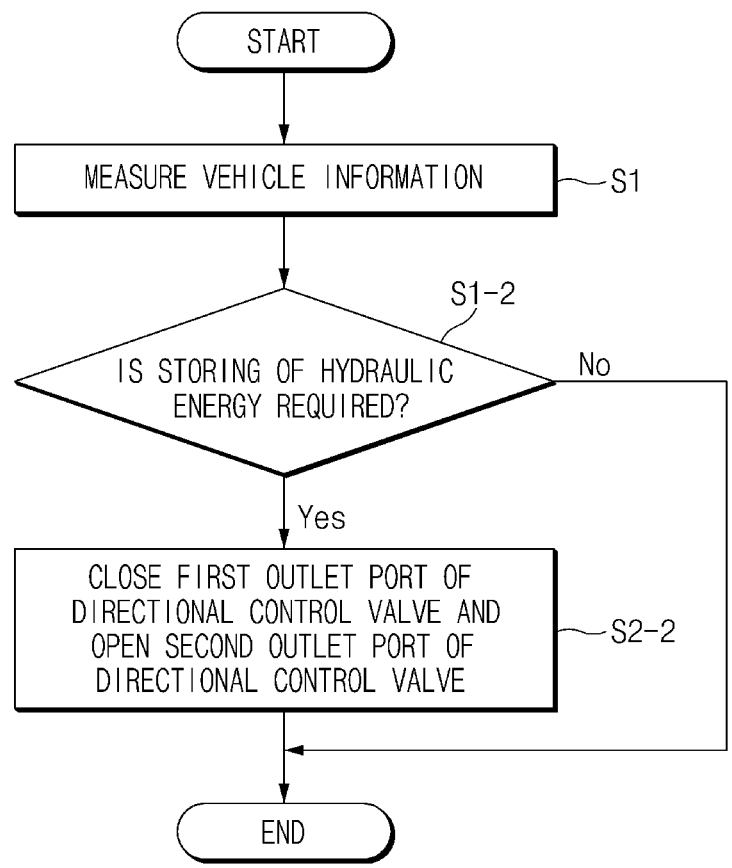
FIG. 7 is a flow chart illustrating operation processes in a hydraulic energy storing mode in the method according to an exemplary embodiment of the present inventive concept.

FIG. 7 is a flow chart illustrating the hydraulic energy storing mode in which the hydraulic energy generated by the hydraulic pump 210 is stored.

Various vehicle information such as information on whether or not the vehicle is braked, information on whether or not the vehicle is accelerated, information on a gear shifting state, vehicle speed information, various information of the expander 120, information on a pressure state of the hydraulic supply line 231, and the like, is measured (S1), and the controller 300 decides whether or not storing of the hydraulic energy is required (S1-2). For example, when an operation of the brake sensor 401 is sensed, it may be decided that the vehicle is in a braking state, such that it may be decided that the storing of the hydraulic energy is required. In addition, when a vehicle speed sensed by the vehicle speed sensor 404 is a set value or less or is in a decrease state, an RPM of the engine 10 sensed by the RPM sensor 405 is decreased, a gear shifting manipulation, or the like, is sensed by the clutch sensor 403 or the shifting detecting sensor, or the RPM, temperature information, flow rate information, and the like, of the expander 120 detected by the sensor 125 of the expander 120 are set values or less, it may be decided that the storing of the hydraulic energy is required.

The directional control valve 240 is switched into the second position 242 by the actuators 248a and 248b to close the first outlet port 246 and open the second outlet port 247 (S2-2).

Therefore, the input port 245 is in communication with the second outlet port 247, such that the fluid supplied from the hydraulic pump 210 is supplied to the accumulator 250 (see an arrow C). Therefore, the accumulator 250 may store the hydraulic energy therein.

The pressure of the fluid passing through the hydraulic motor 220 is maintained as the lowest pressure by the pressure relief valve 280, such that the hydraulic motor 220 becomes an unloading state. Therefore, since the hydraulic energy is not applied to the hydraulic motor 220, a connection between the engine 10 and the expander 120 is blocked, thereby preventing the power of the engine 10 from being lost.

Figure 8:
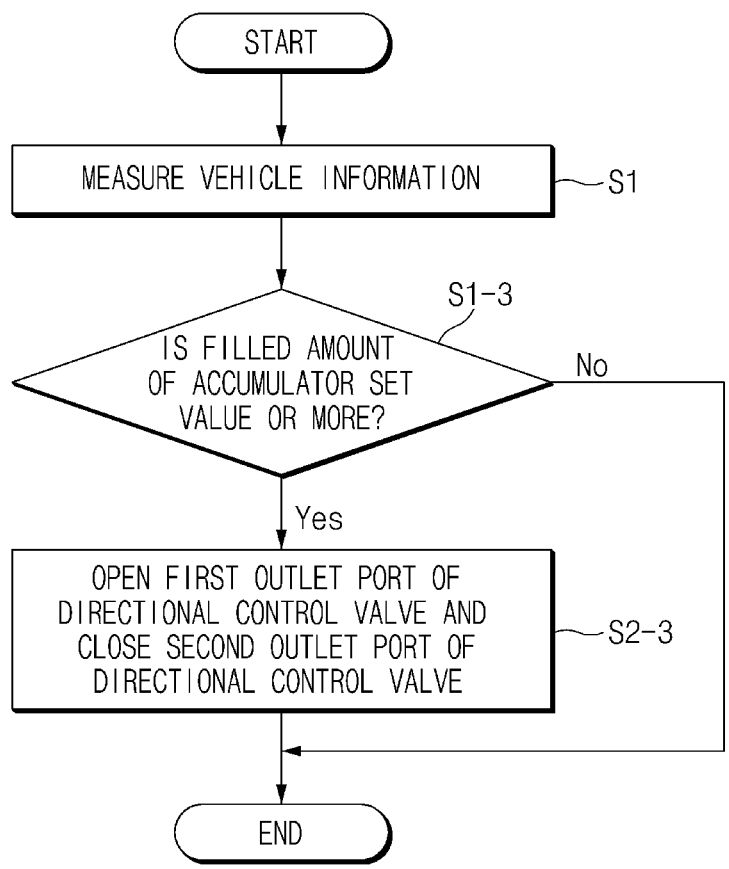
FIG. 8 is a flow chart illustrating operation processes in an idle mode in the method according to an exemplary embodiment of the present inventive concept.

FIG. 8 illustrates the idle mode in which the fluid supplied from the hydraulic pump 210 is simply circulated on the hydraulic supply line 231 and the hydraulic return line 232.

Various vehicle information such as information on whether or not the vehicle is braked, information on whether or not the vehicle is accelerated, information on a gear shifting state, vehicle speed information, various information of the expander 120, information on a pressure state of the hydraulic supply line 231, a filled state of the accumulator 250, and the like, is measured (S1), and the controller 300 decides whether or not a filled amount of the accumulator 250 is a set value or more in a state in which the vehicle stops, that is, a state in which it is sensed that the vehicle speed detected by the vehicle speed sensor 404 is a set value or less or is decreased (S1-3).

When the filled amount of the accumulator 250 is the set value or more in the state in which the vehicle stops, the directional control valve 240 is switched into the third position 243 by the actuators 248a and 248b to open the first outlet port 246 and close the second outlet port 247 (S2-3).

Therefore, the inlet port 245 is in communication with the first outlet port 246, such that a simple circulation flow in which the fluid supplied from the hydraulic pump 210 is transported toward the hydraulic motor 220 and is then returned to the hydraulic pump 210 may be performed. Therefore, a loss of the hydraulic energy may be minimized, and stability of the hydraulic system may be secured.

The pressure of the fluid passing through the hydraulic motor 220 is maintained as the lowest pressure by an operation of the pressure relief valve 280, such that the hydraulic motor 220 becomes an unloading state. Therefore, since the hydraulic energy is not applied to the hydraulic motor 220, a connection between the engine 10 and the expander 120 is blocked, thereby preventing the power of the engine 10 from being lost.

Since not the entire recovered power of the expander 120 need to be transferred to the hydraulic pump 210, extra recovered power may be transferred to other accessories such as a power generator 160 and the like, through the gear box 150, such that utilization of the recovered power may be improved.

As described above, according the an exemplary embodiment, the power recovered by the WHRU is converted into the hydraulic energy and is then transferred to the output shaft of the engine, thereby minimizing a loss rate of the recovered power when transferring the recovered power. Particularly, after the recovered power is converted into the hydraulic energy, the hydraulic energy may be very easily stored, such that utilization of the recovered power may be significantly improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for transferring recovered power of a waste heat recovery unit (WHRU) for a vehicle, the apparatus comprising:
   a hydraulic pump converting the recovered power generated by an expander of the WHRU into a hydraulic energy;
   a hydraulic motor converting the hydraulic energy converted by the hydraulic pump into a rotational energy and transferring the rotational energy to a vehicle engine, and connected to the hydraulic pump through a hydraulic line;
   an accumulator connected to the hydraulic line through a branch line; and
   a directional control valve allowing a fluid supplied from the hydraulic pump to flow toward at least any one of the hydraulic motor and the accumulator,
   wherein the hydraulic line includes: a hydraulic supply line connecting an outlet port of the hydraulic pump and an inlet port of the hydraulic motor to each other; and a hydraulic return line connecting an outlet port of the hydraulic motor and an inlet port of the hydraulic pump to each other,
   wherein the directional control valve installed at a connection portion of the hydraulic supply line and the branch line, and
   wherein the directional control valve has: an inlet port connected to the outlet port of the hydraulic pump; a first outlet port connected to the inlet port of the hydraulic motor; and a second outlet port connected to the accumulator.

2. The apparatus according to claim 1, wherein the directional control valve has: a first position at which both of the first outlet port and the second outlet port are opened; a second position at which the first outlet port is closed and the second outlet port is opened; and a third position at which the first outlet port is opened and the second outlet port is closed, and
   wherein the directional control valve is switched into the first position, the second position, and the third position by one or more actuators.

3. The apparatus according to claim 2, wherein at the first position, the inlet port, the first outlet port, and the second outlet port communicate with each another.

4. The apparatus according to claim 2, wherein at the second position, the inlet port communicates with the second outlet port.

5. The apparatus according to claim 2, wherein at the third position, the inlet port communicates with the first outlet port.

6. The apparatus according to claim 1, further comprising a check valve preventing a counter flow of the fluid from the accumulator to the hydraulic pump.

7. The apparatus according to claim 6, wherein the check valve is installed between the directional control valve and the hydraulic pump.

8. The apparatus according to claim 1, further comprising an unloading means selectively unloading the hydraulic motor.

9. The apparatus according to claim 8, wherein the unloading means is a pressure relief valve installed adjacent to the hydraulic motor.

10. The apparatus according to claim 9, wherein a bypass path is installed between an inlet port and an outlet port of the hydraulic motor, and the pressure relief valve is installed on the bypass path.

11. The apparatus according to claim 1, wherein a pressure sensor is installed on the hydraulic supply line.

12. A method for transferring recovered power of a waste heat recovery unit (WHRU) including a hydraulic pump connected to an expander of the WHRU, a hydraulic motor connected to the hydraulic pump through a hydraulic line, an accumulator installed on the hydraulic line, and a directional control valve installed at a portion at which the hydraulic line and the accumulator are connected to each other, the method comprising:
 a measuring step of measuring vehicle information; and
 a fluid flow direction controlling step of controlling a flow direction of a fluid circulated through the hydraulic line using the vehicle information measured in the measuring step,
 wherein in the fluid flow direction controlling step, the fluid is supplied from the hydraulic pump to the hydraulic motor to generate rotational energy in an assist power mode, from the hydraulic pump to the accumulator to thereby be stored in the accumulator in a hydraulic energy storing mode, and from the hydraulic pump is simply circulated on the hydraulic line an idle mode,
 wherein the directional control valve has an inlet port connected to an outlet port of the hydraulic pump, a first outlet port connected to an inlet port of the hydraulic motor, and a second outlet port connected to the accumulator, and
 wherein in the idle mode, when it is determined through the vehicle information measured in the measuring step that a stop state of a vehicle is continued for a set time or more and a filled amount of the accumulator is a set value or more, the first outlet port of the directional control valve is opened and the second outlet port of the directional control valve is closed, and the hydraulic motor is controlled in an unloading state.

13. The method according to claim 12,
 wherein in the assist power mode, when it is determined on the basis of the vehicle information measured in the measuring step that an assist power is required in an engine, the first outlet port and the second outlet port of the directional control valve are opened to supply the fluid to the hydraulic motor and the accumulator.

14. The method according to claim 12,
 wherein in the hydraulic energy storing mode, when it is determined on the basis of the vehicle information measured in the measuring step that storing of hydraulic energy is required, the first outlet port of the directional control valve is closed and the second outlet port of the directional control valve is opened to fill the fluid in the accumulator.

* * * * *